US006229962B1

(12) United States Patent
Imamura (10) Patent No.: US 6,229,962 B1
(45) Date of Patent: May 8, 2001

(54) ZOOM LENS AND CAMERA USING THE SAME

(75) Inventor: Masahiro Imamura, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/418,593

(22) Filed: Oct. 15, 1999

(30) Foreign Application Priority Data

Oct. 16, 1998 (JP) ............................................ 10-295399

(51) Int. Cl.$^7$ ............................ G03B 17/00; G02B 15/14
(52) U.S. Cl. ........................................... 396/79; 359/688
(58) Field of Search ........................ 396/79, 72; 359/688, 359/775, 776, 777, 778

(56) References Cited

U.S. PATENT DOCUMENTS

| 3,975,089 | 8/1976 | Betensky | 359/688 |
| 4,634,236 | * 1/1987 | Masumoto | 396/79 X |
| 5,221,995 | 6/1993 | Yaneyama | 359/688 |

FOREIGN PATENT DOCUMENTS

| 5-27173 | 2/1993 | (JP) . |
| 5-181062 | 7/1993 | (JP) . |
| 6-250086 | 9/1994 | (JP) . |
| 8-234107 | 9/1996 | (JP) . |

* cited by examiner

Primary Examiner—W. B. Perkey
(74) Attorney, Agent, or Firm—Pillsbury Winthrop LLP (57) ABSTRACT

A zoom lens includes the first lens unit with a positive refracting power, the second lens unit with a negative refracting power, the third lens unit with a negative refracting power, and the fourth lens unit with a positive refracting power. When the magnification is changed, ranging from the wide-angle position to the telephoto position, each of the second, third, and fourth lens units is moved independently along the optical axis. In this case, the zoom lens satisfies the following conditions:

$$D_i/f_w > 0.65$$

$$\beta_{2w} > -0.35$$

where $D_i$ is the maximum image height of the zoom lens, $f_w$ is the focal length of the zoom lens at the wide-angle position, and $\beta_{2w}$ is the lateral magnification of the second lens unit at the wide-angle position of the zoom lens.

19 Claims, 8 Drawing Sheets

FIG. 1

FIG. 2A SPHERICAL ABERRATION
FIG. 2B ASTIGMATISM
FIG. 2C DISTORTION
FIG. 2D CHROMATIC ABERRATION OF MAGNIFICATION

FIG. 3A SPHERICAL ABERRATION
FIG. 3B ASTIGMATISM
FIG. 3C DISTORTION
FIG. 3D CHROMATIC ABERRATION OF MAGNIFICATION

FIG. 4A SPHERICAL ABERRATION
FIG. 4B ASTIGMATISM
FIG. 4C DISTORTION
FIG. 4D CHROMATIC ABERRATION OF MAGNIFICATION

ZOOM LENS AND CAMERA USING THE SAME

BACKGROUND OF THE INVENTION

1. Field of the Invention

This invention relates to a zoom lens suitable for a camera using a pickup tube or a solid-state image sensor, such as a video camera or an electronic still camera.

2. Description of Related Art

Rapid popularization in video cameras and electronic still cameras in recent years is largely attributable to their compact and lightweight designs. In order to increasingly popularize such cameras, it is necessary to facilitate further compact and lightweight designs and cost reductions of the cameras.

A zoom lens used in the latest video camera or electronic still camera requires conditions such as improvements in performance and magnification and an increase in diameter, not to speak of a compact and lightweight design and a cost reduction. In order to satisfy such requirements, it is necessary to realize a compact and lightweight design and a cost reduction of the entire lens system including a mechanical portion. For example, one of zoom lenses typical of the above case comprises a first lens unit with a positive refracting power, fixed when its magnification is changed; a second lens unit, called a variator, with a negative refracting power, moved when the magnification is changed and possessing a variable magnification function; a third lens unit, called a compensator, with a negative refracting power, moved when the magnification is changed and possessing the function of constantly holding the position of an image plane; and a fourth lens unit with a positive refracting power, fixed when the magnification is changed.

The specification of such a zoom lens is disclosed, for example, in each of Japanese Patent Preliminary Publications Nos. Hei 3-155516 and Hei 5-181062, and is such that an angle of view of incidence is about 50–60° at an wide-angle position, an F-number is about 2, and a variable magnification ratio is about 5–11.

In addition to the above specification, the zoom lens used in the latest video camera or electronic still camera also requires a wider angle of view at the wide-angle position. For a zoom lens satisfying this requirement, there is a zoom lens for TV cameras, such as that set forth, for example, in Japanese Patent Preliminary Publication No. Hei 6-250086. This zoom lens includes four lens units with positive, negative, negative, and positive powers, arranged in this order from the object side, and is designed so that the angle of view of incidence is 80° at the wide-angle position, the variable magnification ratio is 8, and the F-number is 1.7. In this zoom lens, however, the number of lenses used is large and thus the entire lens system becomes very bulky.

Japanese Patent Preliminary Publication No. Hei 8-234107 proposes a zoom lens which includes four lens units with positive, negative, negative, and positive powers, arranged in this order from the object side, and is designed so that the angle of view of incidence is about 60° at the wide-angle position, the variable magnification ratio is 8, and the F-number is 2. This zoom lens is such that when the magnification is changed, a first lens unit is fixed, second to fourth lens units are moved, and a stop interposed between the second lens unit and the third lens unit is fixed with respect to an image plane. In this zoom lens, however, the number of lenses used is also large and thus the entire lens system becomes very bulky.

In general, in order to increase the angle of view of incidence at the wide-angle position and keep the diameter of the front lens of the first lens unit to a minimum at the same time in a zoom lens of such a type that four lens units with positive, negative, negative, and positive powers are arranged in this order from the object side, it is necessary to locate an entrance pupil as close to the first lens unit as possible at the wide-angle position. For this purpose, the negative refractive power of the second lens unit must be strengthened so that a ray of light imaged close to the maximum image height of the image plane is largely refracted at the wide-angle position by the second lens unit.

However, in a conventional zoom lens constructed with the four lens units with positive, negative, negative, and positive powers, as mentioned above, so that when the magnification is changed, the first and fourth lens units are fixed and the second and third lens units are move, the magnification is chiefly changed by the movement of the second lens unit, and thus the amount of movement of the second lens unit becomes considerable. Hence, if the negative refracting power of the second lens unit is strengthened, the light beam of the marginal angle of view, refracted by the second lens unit will be widely spread in the vicinity of the first lens unit with respect to the optical axis at a telephoto position. Consequently, when an attempt is made to prepare a wide-angle design in the conventional zoom lens constructed with the four lens units as described above, it is difficult to hold the balance of the position of the entrance pupil between the wide-angle position and the telephoto position. Furthermore, it becomes very difficult to correct aberration because the number of degrees of freedom of a lens system is highly limited when the magnification is changed. In order to solve the problem of correcting aberration, it is necessary to increase the number of lenses of each lens unit, but this causes increase in weight and cost. Moreover, the entire length of each lens unit must be reduced to hold a space for movement of each lens unit, and thus a vicious circle such that the front lens of the first lens unit must be enlarged may be caused.

SUMMARY OF THE INVENTION

It is, therefore, an object of the present invention to provide a zoom lens which is comparatively simple in arrangement, but is designed so that the angle of view of incidence is at least 60° at the wide-angle position, the variable magnification ratio is at least 5, and the F-number is about 2–2.8, is small in size, and has good optical performance, and a camera using this zoom lens.

In order to achieve the above object, the zoom lens according to the present invention comprises, in order from the object side, a first lens unit with a positive refracting power, a second lens unit with a negative refracting power, a third lens unit with a negative refracting power, and a fourth lens unit with a positive refracting power. When the magnification is changed, ranging from the wide-angle position to the telephoto position, each of the second, third, and fourth lens units is moved independently along the optical axis. In this case, the zoom lens satisfies the following conditions:

$$D_i/f_w > 0.65$$

$$\beta_{2w} > -0.35$$

where $D_i$ is the maximum image height of the zoom lens, $f_w$ is the focal length of the zoom lens at the wide-angle position, and $\beta_{2w}$ is the lateral magnification of the second lens unit of the zoom lens at the wide-angle position.

Further, the zoom lens of the present invention comprises, in order from the object side, a first lens unit with a positive refracting power, a second lens unit with a negative refracting power, a third lens unit with a negative refracting power, and a fourth lens unit with a positive refracting power. When the magnification is changed, ranging from the wide-angle position to the telephoto position, each of the first, second, third, and fourth lens units is moved independently along the optical axis. In this case, the zoom lens satisfies the above conditions.

Also, in this zoom lens, when the magnification is changed, ranging from the wide-angle position to the telephoto position, the first lens unit may be moved toward the object side.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

The zoom lens according to the present invention comprises, in order from the object side, a first lens unit with a positive refracting power, a second lens unit with a negative refracting power, a third lens unit with a negative refracting power, and a fourth lens unit with a positive refracting power. When the magnification is changed, ranging from the wide-angle position to the telephoto position, each of the second, third, and fourth lens units is moved independently along the optical axis. In this case, the zoom lens satisfies the following conditions:

$$D_i/f_w > 0.65 \tag{1}$$

$$\beta_{2w} > -0.35 \tag{2}$$

where $D_i$ is the maximum image height of the zoom lens, $f_w$ is the focal length of the zoom lens at the wide-angle position, and $\beta_{2w}$ is the lateral magnification of the second lens unit of the zoom lens at the wide-angle position.

Further, the zoom lens of the present invention comprises, in order from the object side, a first lens unit with a positive refracting power, a second lens unit with a negative refracting power, a third lens unit with a negative refracting power, and a fourth lens unit with a positive refracting power. When the magnification is changed, ranging from the wide-angle position to the telephoto position, each of the first, second, third, and fourth lens units is moved independently along the optical axis. In this case, the zoom lens satisfies Conditions (1) and (2).

The zoom lens of the present invention is designed so that when the magnification is changed, the fourth lens unit with a positive refracting power is moved along the optical axis to thereby perform the variable magnification function and reduce the amount of movement of the second lens unit acting as a variator in which a negative refracting power is strong. Furthermore, by properly setting the refracting powers of the first and second lens units and an air space between them, the position of the entrance pupil is balanced between the wide-angle position and the telephoto position.

In this way, the divergence of a marginal beam caused by the first lens unit is suppressed at each of the wide-angle position and the telephoto position, and it becomes possible to construct a compact zoom lens, although wider-angle than in a conventional type.

The zoom lens of the present invention is also designed so that the fourth lens unit, like the third lens unit, has the role of a compensator for correcting the movement of the image plane caused by a change of the focal length of a lens system.

Thus, each of the third and fourth lens units is moved independently, and thereby the degree of freedom of correction for aberration is improved.

In order to achieve a compact and wide-angle design in the zoom lens of the present invention, that is, satisfy Condition (1), it is necessary to increase the refracting power of the second lens unit. In this case, it is also necessary to properly set the power distribution of individual lens units in view of a state of light passing through the lens units and correction for aberration.

Moreover, in the zoom lens of the present invention, it is necessary to satisfy Condition (2) on the premise that it satisfies Condition (1).

In the zoom lens of the present invention, if the lateral magnification $\beta_{2w}$ of the second lens unit is below −0.35 at the wide-angle position, the extent to which a ray of light imaged close to the maximum image height of the image plane is refracted by the second lens unit becomes small, and thus the outside diameter of the first lens unit must be enlarged, which is unfavorable.

In the zoom lens of the present invention, when the variable magnification ratio is low, it is easy to fix the first lens unit in changing the magnification. However, where the variable magnification ratio is made high, good optical performance is obtained when the first lens unit is slightly moved in changing the magnification so that the air space between the first and second lens units is widened at the telephoto position.

In the case where the first lens unit is moved in changing the magnification, the space between the second and third lens units can be made narrower at the wide-angle position than in the case where the first lens unit is fixed. As such, the height of the ray of light imaged close to the maximum image height of the image plane, incident through the second lens unit on the third lens unit, can be reduced, and chromatic aberration of magnification is corrected at the wide-angle position.

The zoom lens of the present invention provides the fourth lens unit with the variable magnification function, and thus when the magnification is changed, ranging from the wide-angle position to the telephoto position, the fourth lens unit is moved from the image side toward the object side, and a distance between the second and fourth lens units becomes shortest at the telephoto position.

Hence, in the zoom lens of the present invention, it is desirable that when the magnification is changed, ranging from the wide-angle position to the telephoto position, the third lens unit is moved from the image side toward the object side in order to ensure the amount of movement of the fourth lens unit and achieve compactness of the zoom lens.

Furthermore, it is desirable that when the magnification is changed, ranging from the wide-angle position to the telephoto position, the absolute value of the lateral magnification of the fourth lens unit varies on the basis of 1. Specifically, when the magnification is changed, the fourth lens unit is moved so that the absolute value of a lateral magnification $\beta_{4w}$ of the fourth lens unit at the wide-angle position becomes smaller than 1 and that of a lateral magnification $\beta_{4t}$ of the fourth lens unit at the telephoto position becomes larger than 1. In this way, the fourth lens unit is charged with a part of loads to which the first to third lens units are subjected when the magnification is changed, and a higher variable magnification ratio and further compactness can be attained.

In the zoom lens of the present invention, when an attempt is made to increase the variable magnification ratio, there is the need to provide a relatively wide space between the first lens unit and the second lens unit. Hence, the lateral magnification of the second lens unit becomes fairly higher than that of the fourth lens unit. In addition, since the ray of light imaged close to the maximum image height of the image plane, corresponding to the maximum image height, diverges in the vicinity of the first lens unit at a place close to the telephoto or middle position, the outside diameter of the first lens unit must be enlarged. Furthermore, in this case, a balance between astigmatism and chromatic aberration which are produced at the wide-angle and telephoto positions is disturbed, and in order to correct such aberrations, the number of lenses of the first lens unit must be increased. This causes increases in the entire length, outside diameter, and thickness of the first lens unit, and thus the object of the present invention cannot be accomplished.

For the above reasons, it is favorable that the lateral magnifications of the second and fourth lens units in the zoom lens of the present invention satisfy the following condition:

$$\beta_{2t}/\beta_{4t} < 2 \quad (3)$$

where $\beta_{2t}$ is the lateral magnification of the second lens unit at the telephoto position and $\beta_{4t}$ is the lateral magnification of the fourth lens unit at the telephoto position.

In the zoom lens of the present invention, it is desirable that the fourth lens unit is comprised of a front lens unit with a positive power and a rear lens unit with a positive power. In order to correct astigmatism, it is favorable that the rear lens unit is somewhat spaced away from the front lens unit. It is desirable that the front and rear lens units of the fourth lens unit satisfy the following condition:

$$0.5 < f_{4F}/f_{4R} < 0.7 \quad (4)$$

where $f_{4F}$ is the focal length of the front lens unit of the fourth lens unit and $f_{4R}$ is the focal length of the rear lens unit of the fourth lens unit.

Moreover, in order to effectively correct chromatic aberration, it is desirable that the fourth lens unit is provided with at least one cemented lens. It is good practice that an interface between the front and rear lens units of the fourth lens unit has the widest air space of the fourth lens unit or the second widest air space.

The zoom lens of the present invention is designed to receive and converge a divergent beam emerging from the third lens unit, and thus the front lens unit of the fourth lens unit suffers from considerable spherical aberration and coma. In order to correct such aberrations, it is desirable that at least one aspherical surface is used in the rear lens unit of the fourth lens unit. By doing so, spherical aberration and coma can be favorably corrected, and in addition, effects of reducing the overall length of the zoom lens and the number of lenses are brought about.

Also, it is favorable that the aspherical surface used in the rear lens unit of the fourth lens unit has such a shape that the refracting power of the surface declines progressively in going from the optical axis to the periphery thereof.

In general, when a solid-state image sensor is used in an image pickup optical system, there is the need to set the position of the exit pupil of the lens system as far away from the solid-state image sensor as possible. In the zoom lens of the present invention, when the magnification is changed, each of the second, third, and fourth lens units is moved independently along the optical axis. Hence, in order to properly control the position of the exit pupil, it is desirable that a stop is located to be independent of each lens unit. When the magnification changed, ranging from the wide-angle position to the telephoto position, it is good practice to move the stop to be independent of each lens unit.

Also, in the zoom lens of the present invention, it is favorable that the stop is placed in the vicinity of the front or rear of the third lens unit, that is, in a variable air space coming in contact with the third lens unit. By doing so, it becomes easy to place the stop close to the object focal point of a lens unit following the stop.

In the zoom lens of the present invention, when the magnification is changed, ranging from the wide-angle position to the telephoto position, the stop can be moved to be integral with a part of the third lens unit. In this case, a space between the fourth lens unit and the stop is varied, and thus the position of the exit pupil is somewhat shifted. Since, however, the structure of a mirror frame can be simplified, cost can be reduced, compared with the case where the stop is moved to be independent of the third lens unit.

In the conventional zoom lens in which the four lens units with positive, negative, negative, and positive powers are arranged in this order from the object side, it is common practice to perform focusing by moving the first lens unit. When the focusing is performed by the first lens unit, the first lens unit is shifted forward with respect to an effective object point, and therefore the first lens unit must be designed so that its effective diameter has an extra dimension accordingly in regard to the marginal ray.

Such a defect is unexceptional in the zoom lens of the present invention. The light beam at the wide-angle position is incident at a very acute angle on the first lens unit, and hence when the focusing is performed by the first lens unit, the extra dimension of the effective diameter must be made larger. This is unfavorable.

In the zoom lens of the present invention, the position of the exit pupil is set at a considerable distance away from the image plane. Thus, it is good practice to use a part of lenses constituting the fourth lens unit to perform the focusing. By doing so, compactness of the first lens unit can be attained. Where the focusing is performed by the fourth lens unit with respect to the effective object point, fluctuations of aberration and the focal length have little influence on the focusing. Moreover, in the zoom lens of the present invention, the fourth lens unit is small in size, and thus its electrical and mechanical drive is facilitated, which is favorable.

The zoom lens, instead of satisfying Condition (1), may satisfy the following condition:

$$0.65 < Di/fw < 0.9 \quad (1\text{-}1)$$

if the upper limit of this condition is exceeded, a total angle of view 2ω will be above 88°, and correction for aberration becomes difficult.

The zoom lens, instead of satisfying Condition (2), may also satisfy the following condition:

$$-0.35 < \beta 2w < -0.15 \quad (2\text{-}1)$$

If the upper limit of this condition is exceeded, the power of the second lens unit will be too strong to correct aberration.

Further, Condition (2) may be replaced by the following condition:

$$-0.3 < \beta 2w \quad (2\text{-}2)$$

The zoom lens, instead of satisfying Condition (3), may satisfy the following condition:

$$0.1 < \beta 2t/\beta 4t < 2 \quad (3\text{-}1)$$

Condition (3) may be replaced by the following condition:

$$\beta 2t/\beta 4t < 1 \quad (3\text{-}2)$$

The use of the zoom lens of the present invention in a camera leads to a camera using a compact zoom lens which has a large angle of view and a high variable magnification ratio and is bright.

The zoom lens of the present invention may be used as a photographic zoom lens or may be constructed as an objective lens for camera finders.

In accordance with the embodiments shown in the drawings, the present invention will be explained in detail below.

First embodiment

Figure 1:
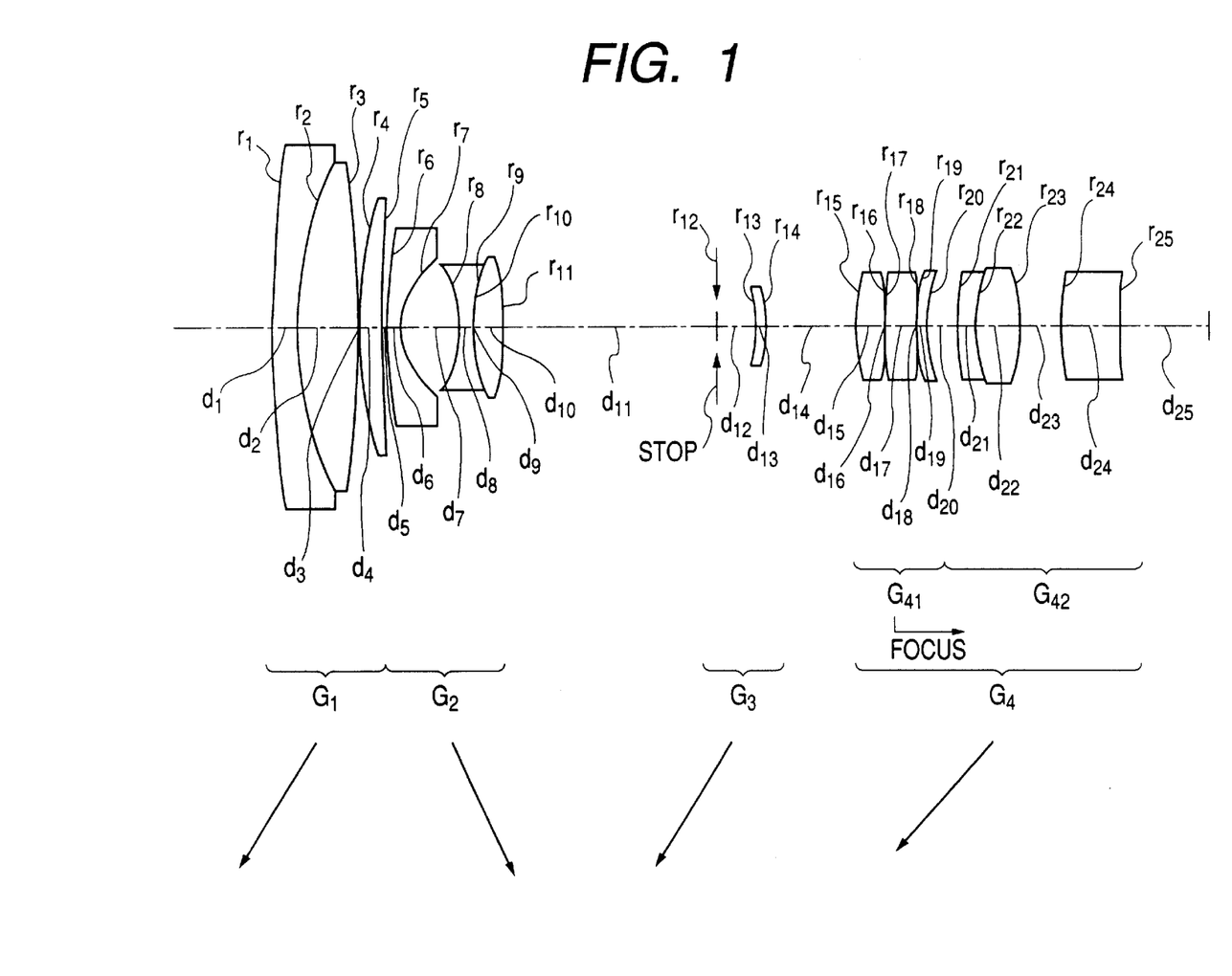
FIG. 1 is a sectional view showing the arrangement, developed along the optical axis, of the zoom lens of a first embodiment in the present invention.
Figure 2A:
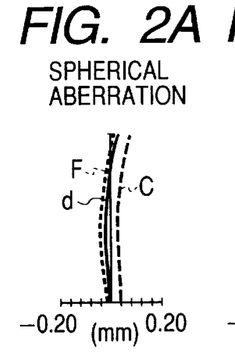
FIGS. 2A, 2B, 2C, and 2D are diagrams showing aberration curves at the wide-angle position of the zoom lens of the first embodiment.
Figure 2B:
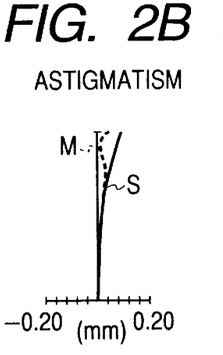
Figure 2C:
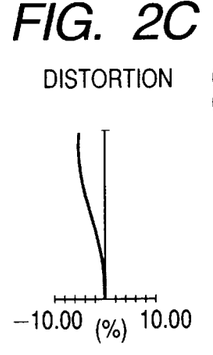
Figure 2D:
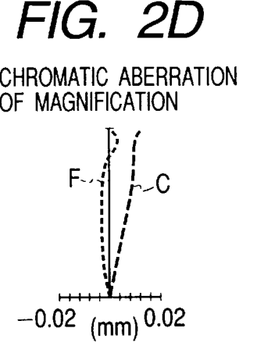
Figure 3A:
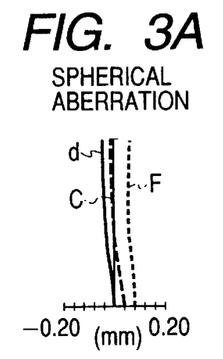
FIGS. 3A, 3B, 3C, and 3D are diagrams showing aberration curves at the middle position of the zoom lens of the first embodiment.
Figure 3B:
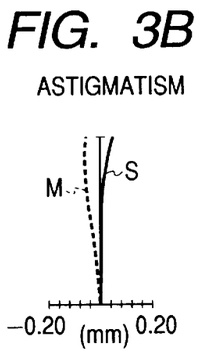
Figure 3C:
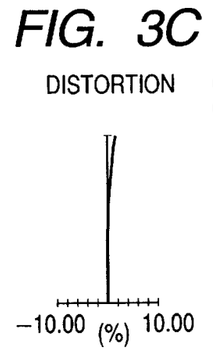
Figure 3D:
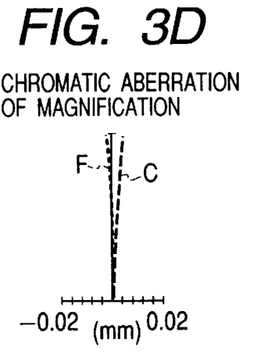
Figure 4A:
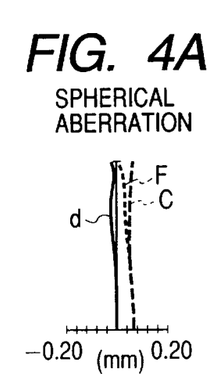
FIGS. 4A, 4B, 4C, and 4D are diagrams showing aberration curves where an infinite object point is focused at the telephoto position of the zoom lens of the first embodiment.
Figure 4B:
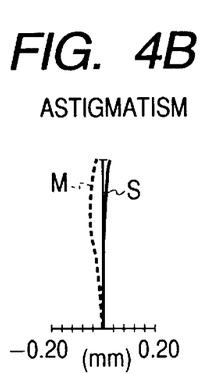
Figure 4C:
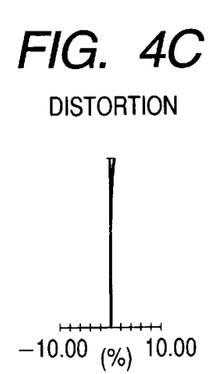
Figure 4D:
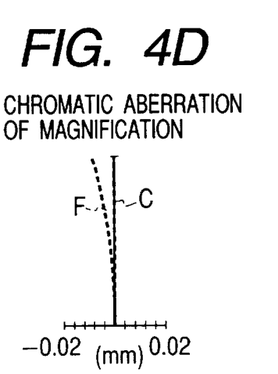

The zoom lens of this embodiment, as shown in FIG. 1, comprises, in order from the object side, a first lens unit G1 with a positive refracting power, a second lens unit G2 with a negative refracting power, a third lens unit G3 with a negative refracting power, and a fourth lens unit G4 with a positive refracting power.

The first lens unit G1 includes, in order from the object side, a positive cemented lens comprised of a negative meniscus lens directing its convex surface toward the object side and a biconvex lens; and a positive meniscus lens directing its convex surface toward the object side. The second lens unit G2 includes, in order from the object side, a meniscus lens with a strong negative refracting power, directing its convex surface toward the object side, a biconcave lens, and a biconvex lens. The third lens unit G3 includes, in order from the object side, a stop and a negative meniscus lens directing its convex surface toward the image side. The fourth lens unit G4 includes, in order from the object side, a front lens unit G41 comprised of two biconvex lenses and a negative meniscus lens directing its convex surface toward the object side, and a rear lens unit G42 comprised of a positive cemented lens having a negative meniscus lens directing its convex surface toward the object side and a biconvex lens, and a positive meniscus lens directing its convex surface toward the object side.

The zoom lens of the first embodiment, as mentioned above, is constructed with 13 lens elements in total. The zoom lens of the first embodiment is designed so that when the magnification is changed, ranging from the wide-angle position to the telephoto position, as indicated by arrows in FIG. 1, the first lens unit G1 is moved along the optical axis from the image side toward the object side; the second lens unit G2, from the object side toward the image side; the third lens unit G3, integrally with the stop from the image side toward the object side; and the fourth lens unit G4, from the image side toward the object side. The focusing relative to a nearby object is performed by moving the front lens unit G41 of the fourth lens unit toward the image side.

Various numerical data relative to the zoom lens of the first embodiment are shown below.

---

Half angle of view of incidence      39.0° (wide-angle)–5.4° (telephoto)
Focal length    5.200 (wide-angle)–18.000 (middle)–41.999 (telephoto)
F-number    2.3 (wide-angle)–3.28 (middle)–3.64 (telephoto)
$\beta 2t = -0.718$
$Di = 4.00$
$f4F = 25.498$
$f4R = 39.750$
$\beta 2w = -0.240$
$\beta 2t/\beta 4t = 0.461$
$Di/fw = 0.769$
$f4F/f4R = 0.641$
$\beta 4w = -0.734$
$\beta 4t = -1.558$
$r_1 = 174.621$
     $d_1 = 2.85$      $n_1 = 1.80518$      $v_1 = 25.42$
$r_2 = 47.876$
     $d_2 = 7.50$      $n_2 = 1.60311$      $v_2 = 60.64$
$r_3 = -207.117$
     $d_3 = 0.10$
$r_4 = 45.137$
     $d_4 = 3.20$      $n_4 = 1.79952$      $v_4 = 42.22$
$r_5 = 130.280$
     $d_5 = 1.00$ (wide-angle), 20.07 (middle), 33.74 (telephoto)
$r_6 = 58.028$
     $d_6 = 1.50$      $n_6 = 1.77250$      $v_6 = 49.60$
$r_7 = 10.050$
     $d_7 = 7.50$
$r_8 = -16.815$
     $d_8 = 1.01$      $n_8 = 1.80440$      $v_8 = 39.59$
$r_9 = 16.000$
     $d_9 = 0.30$
$r_{10} = 18.462$ (aspherical)
     $d_{10} = 4.50$      $n_{10} = 1.84666$      $v_{10} = 23.78$
$r_{11} = -31.513$
     $d_{11} = 28.87$ (wide-angle), 9.11 (middle), 0.45 (telephoto)
$r_{12} = \infty$ (stop)
     $d_{12} = 5.32$
$r_{13} = -17.158$
     $d_{13} = 1.00$      $n_{13} = 1.77250$      $v_{13} = 49.60$ -continued $r_{14} = -33.394$
$d_{14} = 12.38$ (wide-angle), 5.21 (middle), 4.10 (telephoto)
$r_{15} = 22.156$
$d_{15} = 4.00$   $n_{15} = 1.56384$   $\nu_{15} = 60.67$
$r_{16} = -70.000$ (aspherical)
$d_{16} = 0.10$
$r_{17} = 80.000$
$d_{17} = 4.00$   $n_{17} = 1.83400$   $\nu_{17} = 37.16$
$r_{18} = -163.569$
$d_{18} = 0.10$
$r_{19} = 28.813$
$d_{19} = 1.50$   $n_{19} = 1.80518$   $\nu_{19} = 25.42$
$r_{20} = 20.109$
$d_{20} = 4.10$
$r_{21} = 45.680$
$d_{21} = 2.00$   $n_{21} = 1.80518$   $\nu_{21} = 25.42$
$r_{22} = 16.120$
$d_{22} = 6.22$   $n_{22} = 1.48749$   $\nu_{22} = 70.23$
$r_{23} = -23.619$
$d_{23} = 5.36$
$r_{24} = 30.405$
$d_{24} = 8.00$   $n_{24} = 1.60311$   $\nu_{24} = 60.64$
$r_{25} = 38.267$
$d_{25} = 12.12$ (wide-angle), 22.92 (middle), 28.06 (telephoto)

Aspherical coefficients
Tenth surface
A4=4.21874×10$^{-5}$, A6=-2.70477×10$^{-7}$,
A8=5.14683×10$^{-9}$, A10=5.67171×10$^{-11}$
Sixteenth surface
A4=4.23278×10$^{-5}$, A6=7.81284×10$^{-8}$,
A8=-1.07671×10$^{-9}$, A10=5.08632×10$^{-12}$ The following are data relative to the amount of movement of the front lens unit G41 of the fourth lens unit toward the image side in the case where the focusing is performed from the infinite object point to the nearby object point. It is assumed that the movement of the lens unit toward the image side is expressed by a minus sign.

| Object distance | Wide-angle position | Middle position | Telephoto position |
| --- | --- | --- | --- |
| 1 m | -0.07 | -0.18 | -0.62 |
| 30 cm | -0.22 | -0.52 | -1.51 |

FIGS. 2A–2D, 3A–3D, and 4A–4D show aberration curves in the zoom lens of the first embodiment.

Second embodiment

Figure 5:
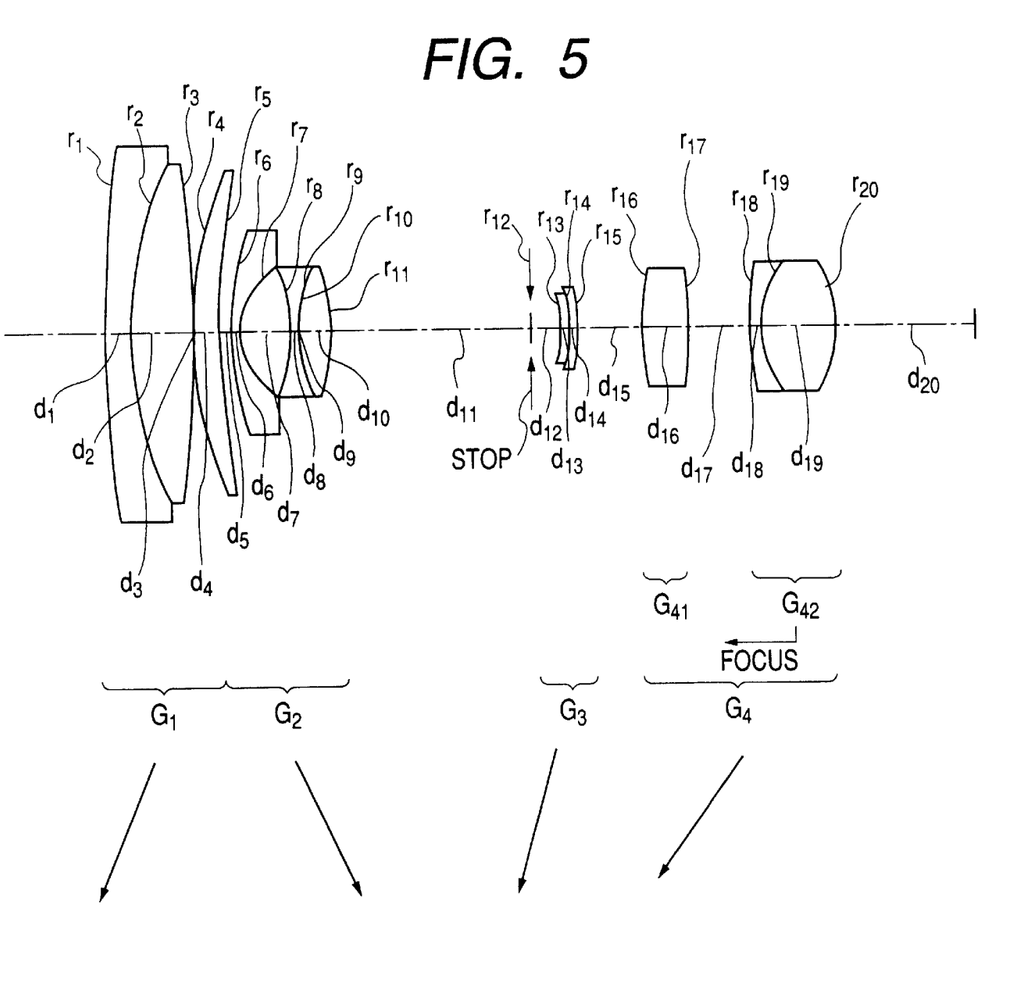
FIG. 5 is a sectional view showing the arrangement, developed along the optical axis, of the zoom lens of a second embodiment in the present invention.

The zoom lens of this embodiment, as shown in FIG. 5, comprises, in order from the object side, the first lens unit G1 with a positive refracting power, the second lens unit G2 with a negative refracting power, the third lens unit G3 with a negative refracting power, and the fourth lens unit G4 with a positive refracting power.

The arrangement of each of the first and second lens units g1 and G2 is the same as in the first embodiment. The third lens unit G3 includes, in order from the object side, a stop and a negative cemented lens comprised of a negative meniscus lens directing its convex surface toward the image side and a positive meniscus lens directing its convex surface toward the image side. The fourth lens unit G4 includes, in order from the object side, the front lens unit G41 comprised of a biconvex lens and the rear lens unit G42 comprised of a positive cemented lens having a negative meniscus lens directing its convex surface toward the object side and a biconvex lens.

The zoom lens of the second embodiment, as mentioned above, is constructed with 11 lens elements in total. The zoom lens of the second embodiment is designed so that when the magnification is changed, ranging from the wide-angle position to the telephoto position, as indicated by arrows in FIG. 5, the first lens unit G1 is moved along the optical axis from the image side toward the object side; the second lens unit G2, from the object side toward the image side; the third lens unit G3, integrally with the stop from the image side toward the object side; and the fourth lens unit G4, from the image side toward the object side. The focusing relative to a nearby object is performed by moving the rear lens unit G42 of the fourth lens unit toward the object side.

Various numerical data relative to the zoom lens of the second embodiment are shown below.

Half angle of view of incidence  39.3° (wide-angle)–7.8° (telephoto)
Focal length  5.200 (wide-angle)–11.000 (middle)–29.000 (telephoto)
F-number  2.80 (wide-angle)–3.12 (middle)–3.32 (telephoto)
$\beta 2t = -0.639$
$Di = 4.00$
$f4F = 23.527$
$f4R = 38.210$
$\beta 2w = -0.218$
$\beta 2t/\beta 4t = 0.580$
$Di/fw = 0.769$
$f4F/f4R = 0.615$
$\beta 4w = -0.713$
$\beta 4t = -1.101$
$r_1 = 249.726$
$d_1 = 3.02$   $n_1 = 1.80518$   $\nu_1 = 25.42$
$r_2 = 46.958$
$d_2 = 7.92$   $n_2 = 1.60311$   $\nu_2 = 60.64$
$r_3 = -219.555$
$d_3 = 0.10$
$r_4 = 42.049$
$d_4 = 4.22$   $n_4 = 1.83400$   $\nu_4 = 37.16$
$r_5 = 113.373$
$d_5 = 1.00$ (wide-angle), 16.29 (middle), 35.03 (telephoto)
$r_6 = 34.905$
$d_6 = 1.01$   $n_6 = 1.77250$   $\nu_6 = 49.60$
$r_7 = 9.000$
$d_7 = 6.00$
$r_8 = -18.322$
$d_8 = 1.01$   $n_8 = 1.81600$   $\nu_8 = 46.62$
$r_9 = 16.000$
$d_9 = 0.30$
$r_{10} = 16.833$ (aspherical)
$d_{10} = 3.66$   $n_{10} = 1.84666$   $\nu_{10} = 23.78$
$r_{11} = -44.925$
$d_{11} = 26.30$ (wide-angle), 13.03 (middle), 3.27 (telephoto)
$r_{12} = \infty$ (stop)
$d_{12} = 3.73$
$r_{13} = -13.028$
$d_{13} = 1.00$   $n_{13} = 1.84666$   $\nu_{13} = 23.78$
$r_{14} = -20.860$
$d_{14} = 1.15$   $n_{14} = 1.62012$   $\nu_{14} = 49.55$
$r_{15} = -20.453$
$d_{15} = 8.89$ (wide-angle), 5.99 (middle), 4.76 (telephoto)
$r_{16} = 31.685$
$d_{16} = 6.00$   $n_{16} = 1.67003$   $\nu_{16} = 47.23$
$r_{17} = -28.987$ (aspherical)
$d_{17} = 8.26$
$r_{18} = 34.822$
$d_{18} = 1.50$   $n_{18} = 1.84666$   $\nu_{18} = 23.78$
$r_{19} = 13.128$
$d_{19} = 8.95$   $n_{19} = 1.60311$   $\nu_{19} = 60.64$
$r_{20} = -28.467$
$d_{20} = 18.73$ (wide-angle), 22.84 (middle), 26.16 (telephoto)

Aspherical coefficients
Tenth surface
A4=2.67251×10$^{-5}$, A6=7.33842×10$^{-9}$,
A8=-4.37520×10$^{-9}$, A10=1.82523×10$^{-11}$
Seventeenth surface
A4=3.44720×10$^{-5}$, A6=5.04543×10$^{-8}$,
A8=-7.56036×10$^{-10}$, A10=1.55454×10$^{-12}$ The following are data relative to the amount of movement of the rear lens unit G42 of the fourth lens unit toward the object side in the case where the focusing is performed from the infinite object point to the nearby object point. It is assumed that the movement of the lens unit toward the image side is expressed by a minus sign.

| Object distance | Wide-angle position | Middle position | Telephoto position |
| --- | --- | --- | --- |
| 1 m | 0.03 | 0.13 | 0.78 |
| 30 cm | 0.11 | 0.39 | 2.00 |

Third embodiment

Figure 6:
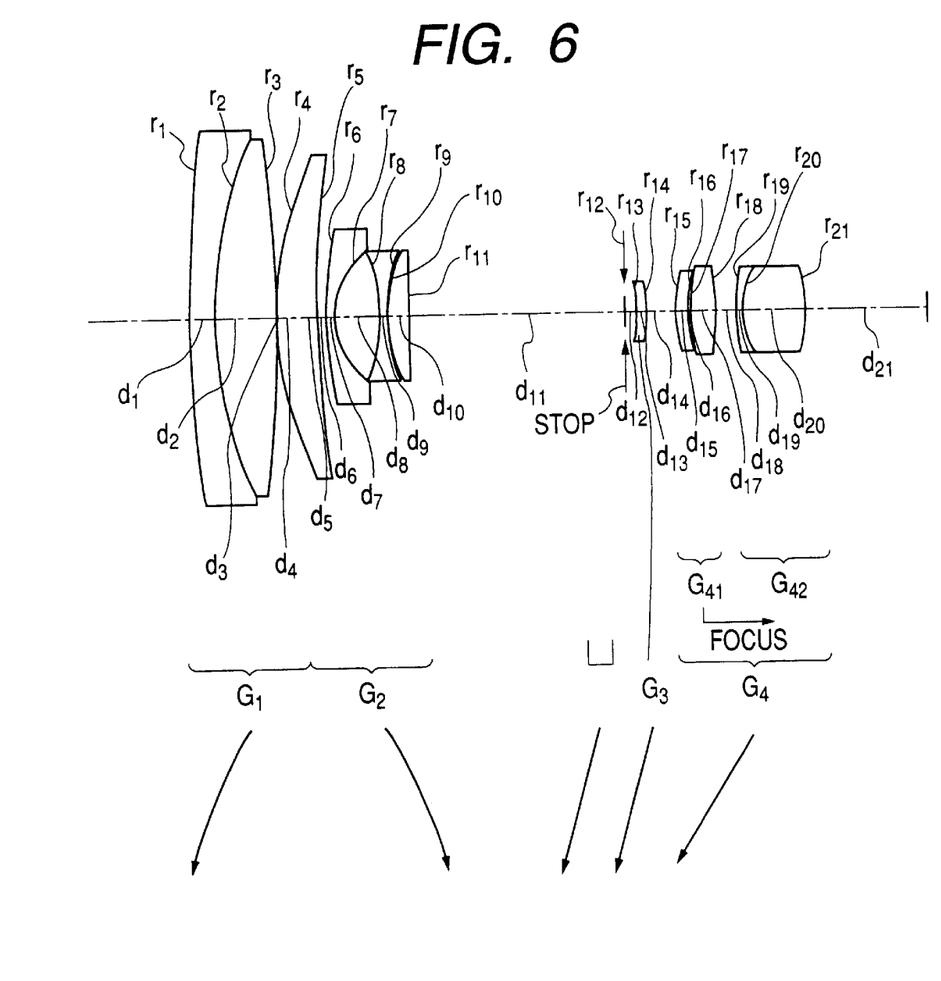
FIG. 6 is a sectional view showing the arrangement, developed along the optical axis, of the zoom lens of a third embodiment in the present invention.

The zoom lens of this embodiment, as shown in FIG. 6, comprises, in order from the object side, the first lens unit G1 with a positive refracting power, the second lens unit G2 with a negative refracting power, the third lens unit G3 with a negative refracting power, and the fourth lens unit G4 with a positive refracting power.

The arrangement of the first lens unit G1 is the same as in the first embodiment. The second lens unit G2 includes, in order from the object side, a meniscus lens with a strong, negative refracting power, directing its convex surface toward the object side, a biconcave lens, and a positive meniscus lens directing its convex surface toward the object side. The third lens unit G3 includes a negative meniscus lens directing its convex surface toward the image side. The fourth lens unit G4 includes, in order from the object side, the front lens unit G41 comprised of a positive meniscus lens directing its convex surface toward the object side and the biconvex lens, and the rear lens unit G42 comprised of a positive cemented lens having a negative meniscus lens directing its convex surface toward the object side and a biconvex lens.

The zoom lens of the third embodiment, as mentioned above, is constructed with a total of 11 lens elements. A stop independent of each lens unit is placed in front of the third lens unit G3.

The zoom lens of the third embodiment is designed so that when the magnification is changed, ranging from the wide-angle position to the telephoto position, as indicated by arrows in FIG. 6, the first lens unit G1 is moved along the optical axis from the image side toward the object side; the second lens unit G2, from the object side toward the image side; the stop, from the image side toward the object side; the third lens unit G3, from the image side toward the object side; and the fourth lens unit G4, from the image side toward the object side. In this case, the stop is moved to be independent of each lens unit. The focusing relative to a nearby object is performed by moving the front lens unit G41 of the fourth lens unit toward the image side.

Various numerical data relative to the zoom lens of the third embodiment are shown below.

Half angle of view of incidence 39.1° (wide-angle)–6.1° (telephoto)
Focal length 5.212 (wide-angle)–15.000 (middle)–37.001 (telephoto)
F-number 2.80 (wide-angle)–2.96 (middle)–3.08 (telephoto)
$\beta 2t = -0.896$
$Di = 4.00$
$f4F = 19.553$
$f4R = 34.759$
$\beta 2w = -0.230$
$\beta 2t/\beta 4t = 0.785$
$Di/fw = 0.767$ -continued $f4F/f4R = 0.563$
$\beta 4w = -0.794$
$\beta 4t = -1.142$
$r_1 = 184.868$
   $d_1 = 2.77$   $n_1 = 1.80518$   $v_1 = 25.42$
$r_2 = 53.603$
   $d_2 = 9.64$   $n_2 = 1.60311$   $v_2 = 60.64$
$r_3 = -220.552$
   $d_3 = 0.10$
$r_4 = 45.836$
   $d_4 = 5.46$   $n_4 = 1.79952$   $v_4 = 42.22$
$r_5 = 114.863$
   $d_5 = 1.00$ (wide-angle), 24.11 (middle), 39.32 (telephoto)
$r_6 = 107.869$
   $d_6 = 1.00$   $n_6 = 1.77250$   $v_6 = 49.60$
$r_7 = 9.487$
   $d_7 = 6.20$
$r_8 = -63.336$
   $d_8 = 1.01$   $n_8 = 1.81600$   $v_8 = 46.62$
$r_9 = 18.195$
   $d_9 = 0.10$
$r_{10} = 15.698$ (aspherical)
   $d_{10} = 3.90$   $n_{10} = 1.84666$   $v_{10} = 23.78$
$r_{11} = 245.211$
   $d_{11} = 30.10$ (wide-angle), 10.06 (middle), 1.00 (telephoto)
$r_{12} = \infty$ (stop)
   $d_{12} = 2.00$ (wide-angle), 3.00 (middle), 4.00 (telephoto)
$r_{13} = -9.085$
   $d_{13} = 1.00$   $n_{13} = 1.77250$   $v_{13} = 49.60$
$r_{14} = -14.115$
   $d_{14} = 4.68$ (wide-angle), 3.75 (middle), 2.87 (telephoto)
$r_{15} = 18.568$
   $d_{15} = 2.00$   $n_{15} = 1.80518$   $v_{15} = 25.42$
$r_{16} = 20.922$
   $d_{16} = 0.51$
$r_{17} = 32.738$
   $d_{17} = 3.50$   $n_{17} = 1.63854$   $v_{17} = 55.38$
$r_{18} = -22.043$ (aspherical)
   $d_{18} = 2.50$
$r_{19} = 26.672$
   $d_{19} = 1.00$   $n_{19} = 1.84666$   $v_{19} = 23.78$
$r_{20} = 10.566$
   $d_{20} = 9.28$   $n_{20} = 1.60311$   $v_{20} = 60.64$
$r_{21} = -28.506$
   $d_{21} = 17.63$ (wide-angle), 21.10 (middle), 22.83 (telephoto)

Aspherical coefficients
Tenth surface
$A4 = 2.19678 \times 10^{-5}$, $A6 = -6.54588 \times 10^{-8}$,
$A8 = 2.08452 \times 10^{-9}$, $A10 = -2.68280 \times 10^{-11}$
Eighteenth surface
$A4 = 5.42704 \times 10^{-5}$, $A6 = 4.16340 \times 10^{-7}$,
$a8 = -7.58263 \times 10^{-9}$, $A10 = 5.76592 \times 10^{-11}$ The following are data relative to the amount of movement of the front lens unit G41 of the fourth lens unit toward the image side in the case where the focusing is performed from the infinite object point to the nearby object point. It is assumed that the movement of the lens unit toward the image side is expressed by a minus sign.

| Object distance | Wide-angle position | Middle position | Telephoto position |
| --- | --- | --- | --- |
| 1 m | −0.06 | −0.22 | −0.89 |
| 30 cm | −0.18 | −0.60 | −2.01 |

Fourth embodiment

Figure 7:
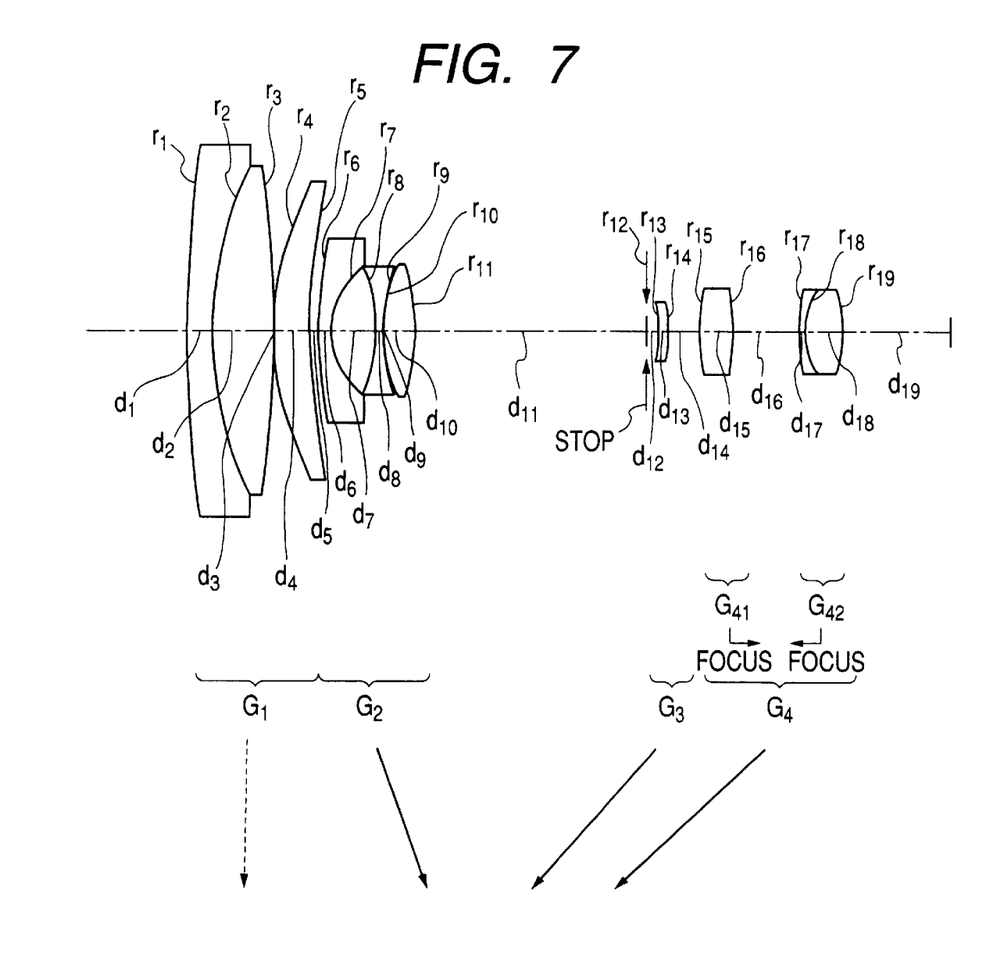
FIG. 7 is a sectional view showing the arrangement, developed along the optical axis, of the zoom lens of a fourth embodiment in the present invention.

The zoom lens of this embodiment, as shown in FIG. 7, comprises, in order from the object side, the first lens unit G1 with a positive refracting power, the second lens unit G2 with a negative refracting power, the third lens unit G3 with a negative refracting power, and the fourth lens unit G4 with a positive refracting power.

The arrangement of each of the first, second, and third lens units G1, G2, and G3 is the same as in the first embodiment. The fourth lens unit G4 is also the same as in the second embodiment.

The zoom lens of the fourth embodiment, as mentioned above, is constructed with 10 lens elements in total. The zoom lens of the fourth embodiment is designed so that when the magnification is changed, ranging from the wide-angle position to the telephoto position, as indicated by arrows in FIG. 7, the first lens unit G1 is fixed; the second lens unit G2 is moved from the object side toward the image side along the optical axis; the third lens unit G3, integrally with the stop from the image side toward the object side; and the fourth lens unit G4, from the image side toward the object side. The focusing relative to a nearby object is performed by moving the front lens unit G41 of the fourth lens unit toward the image side or the rear lens unit G42 of the fourth lens unit toward the object side.

Various numerical data relative to the zoom lens of the fourth embodiment are shown below.

Half angle of view of incidence   39.2° (wide-angle)–7.8° (telephoto)
Focal length   5.224 (wide-angle)–12.999 (middle)–29.020 (telephoto)
F-number   2.80 (wide-angle)–3.16 (middle)–3.89 (telephoto)
$\beta 2t = -0.477$
$Di = 4.00$
$f4F = 21.063$
$f4R = 37.831$
$\beta 2w = -0.242$
$\beta 2t/\beta 4t = 0.323$
$Di/fw = 0.766$
$f4F/f4R = 0.557$
$\beta 4w = -0.727$
$\beta 4t = -1.476$
$r_1 = 297.910$
  $d_1 = 3.01$    $n_1 = 1.80518$    $\nu_1 = 25.42$
$r_2 = 44.453$
  $d_2 = 9.50$    $n_2 = 1.60311$    $\nu_2 = 60.64$
$r_3 = -182.657$
  $d_3 = 0.10$
$r_4 = 41.612$
  $d_4 = 5.00$    $n_4 = 1.83400$    $\nu_4 = 37.16$
$r_5 = 118.739$
  $d_5 = 1.00$ (wide-angle), 18.08 (middle), 24.91 (telephoto)
$r_6 = 63.376$
  $d_6 = 1.50$    $n_6 = 1.77250$    $\nu_6 = 49.60$
$r_7 = 10.103$
  $d_7 = 7.50$
$r_8 = -19.873$
  $d_8 = 1.01$    $n_8 = 1.81600$    $\nu_8 = 46.62$
$r_9 = 17.799$
  $d_9 = 0.30$
$r_{10} = 19.395$ (aspherical)
  $d_{10} = 4.50$    $n_{10} = 1.84666$    $\nu_{10} = 23.78$
$r_{11} = -40.342$
  $d_{11} = 34.18$ (wide-angle), 14.64 (middle), 1.00 (telephoto)
$r_{12} = \infty$ (stop)
  $d_{12} = 2.00$
$r_{13} = -11.264$
  $d_{13} = 1.00$    $n_{13} = 1.84666$    $\nu_{13} = 23.78$
$r_{14} = -16.205$
  $d_{14} = 5.00$ (wide-angle), 3.00 (middle), 1.00 (telephoto)
$r_{15} = 45.260$
  $d_{15} = 5.00$    $n_{15} = 1.77250$    $\nu_{15} = 49.60$
$r_{16} = -24.181$ (aspherical)
  $d_{16} = 10.28$
$r_{17} = 34.489$ -continued $d_{17} = 1.00$    $n_{17} = 1.84666$    $\nu_{17} = 23.78$
$r_{18} = 12.743$
  $d_{18} = 5.00$    $n_{18} = 1.60311$    $\nu_{18} = 60.64$
$r_{19} = -28.173$
  $d_{19} = 17.72$ (wide-angle), 22.18 (middle), 30.99 (telephoto)

Aspherical coefficients
Tenth surface
$A4=3.71324\times 10^{-5}$, $A6=-2.32397\times 10^{-7}$,
$A8=9.85797\times 10^{-10}$, $A10=-1.04597\times 10^{-11}$
Sixteenth surface
$A4=3.04990\times 10^{-5}$, $A6=1.09847\times 10^{-7}$,
$A8=-2.67489\times 10^{-9}$, $A10=1.96027\times 10^{-11}$ The following are data relative to the amount of movement of the front lens unit G41 or the rear lens unit G42 of the fourth lens unit in the case where the focusing is performed from the infinite object point to the nearby object point. It is assumed that the movement of the lens unit toward the image side is expressed by a minus sign.

When the front lens unit G41 is moved in focusing;

| Object distance | Wide-angle position | Middle position | Telephoto position |
| --- | --- | --- | --- |
| 1 m | −0.10 | −0.19 | −0.35 |
| 30 cm | −0.30 | −0.56 | −0.96 |

When the rear lens unit G42 is moved in focusing:

| Object distance | Wide-angle position | Middle position | Telephoto position |
| --- | --- | --- | --- |
| 1 m | 0.04 | 0.19 | 0.80 |
| 30 cm | 0.11 | 0.54 | 2.27 |

Fifth Embodiment

Figure 8:
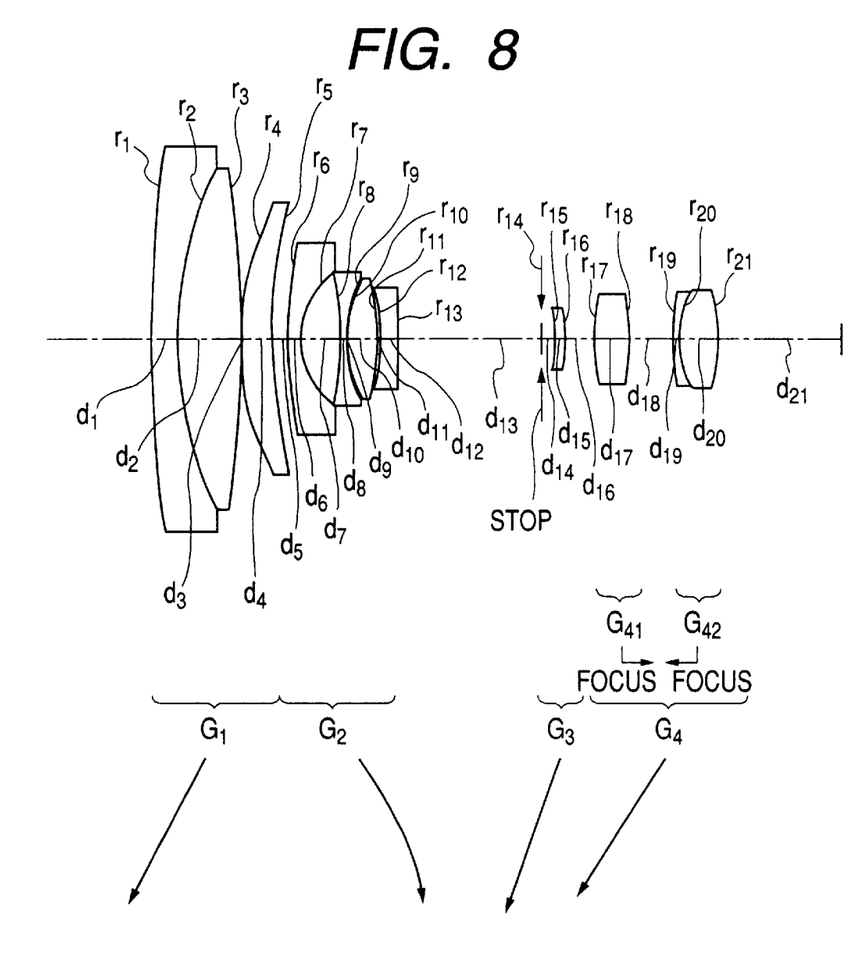
FIG. 8 is a sectional view showing the arrangement, developed along the optical axis, of the zoom lens of a fifth embodiment in the present invention.

The zoom lens of this embodiment, as shown in FIG. 8, comprises, in order from the object side, the first lens unit $G_1$ with a positive refracting power, the second lens unit $G_2$ with a negative refracting power, the third lens unit $G_3$ with a negative refracting power, and the fourth lens unit $G_4$ with a positive refracting power.

The arrangement of each of the first and third lens units $G_1$ and $G_3$ is the same as in the first embodiment. The second lens unit $G_2$ includes, in order from the object side, a strong, negative meniscus lens directing its convex surface toward the object side, a bioconcave lens, a biconvex lens, and a biconcave lens. The arrangement of each of the third and fourth lens units $G_3$ and $G_4$ is the same as in the fourth embodiment.

The zoom lens of the fifth embodiment, as mentioned above, is constructed with a total of 11 lens elements. The zoom lens of the fifth embodiment is designed so that when the magnification is changed, ranging from the wide-angle position to the telephoto position, as indicated by arrows in FIG. 8, the first lens unit $G_1$ is moved along the optical axis from the image side toward the object side; the second lens unit $G_2$, from the object side toward the image side; the third lens unit $G_3$, integrally with the stop from the image side toward the object side; and the fourth lens unit $G_4$, from the image side toward the object side.

The focusing relative to a nearby object is performed by moving the front lens unit $G_{41}$ of the fourth lens unit toward the image side or the rear lens unit $G_{42}$ of the fourth lens unit toward the object side.

Various numerical data relative to the zoom lens of the fifth embodiment are shown below.

| | | |
|---|---|---|
| Half angle of view of incidence | 39.2° (wide-angle)–7.6° (telephoto) | |
| Focal length | 5.200 (wide-angle)–14.499 (middle)–29.977 (telephoto) | |
| F-number | 2.80 (wide-angle)–3.25 (middle)–4.05 (telephoto) | |
| $\beta 2t = -0.438$ | | |
| $Di = 4.00$ | | |
| $f4F = 19.624$ | | |
| $f4R = 29.544$ | | |
| $\beta 2w = -0.205$ | | |
| $\beta 2t/\beta 4t = 0.262$ | | |
| $Di/fw = 0.769$ | | |
| $f4F/f4R = 0.664$ | | |
| $\beta 4w = -0.801$ | | |
| $\beta 4t = -1.674$ | | |
| $r_1 = 337.570$ | | |
| $d_1 = 2.93$ | $n_1 = 1.80518$ | $\nu_1 = 25.42$ |
| $r_2 = 42.309$ | | |
| $d_2 = 9.50$ | $n_2 = 1.60311$ | $\nu_2 = 60.64$ |
| $r_3 = -226.930$ | | |
| $d_3 = 0.10$ | | |
| $r_4 = 37.886$ | | |
| $d_4 = 5.00$ | $n_4 = 1.83400$ | $\nu_4 = 37.16$ |
| $r_5 = 120.528$ | | |
| $d_5 = 1.00$ (wide-angle), 17.43 (middle), 25.02 (telephoto) | | |
| $r_6 = 35.260$ | | |
| $d_6 = 1.50$ | $n_6 = 1.77250$ | $\nu_6 = 49.60$ |
| $r_7 = 9.800$ | | |
| $d_7 = 6.18$ | | |
| $r_8 = -32.518$ | | |
| $d_8 = 1.01$ | $n_8 = 1.81600$ | $\nu_8 = 46.62$ |
| $r_9 = 16.139$ | | |
| $d_9 = 0.30$ | | |
| $r_{10} = 14.000$ | | |
| $d_{10} = 4.50$ | $n_{10} = 1.84666$ | $\nu_{10} = 23.78$ |
| $r_{11} = -25.000$ | | |
| $d_{11} = 0.80$ | | |
| $r_{12} = -17.059$ | | |
| $d_{12} = 1.50$ | $n_{12} = 1.77250$ | $\nu_{12} = 49.60$ |
| $r_{13} = 75.779$ | | |
| $d_{13} = 21.01$ (wide-angle), 6.58 (middle), 1.00 (telephoto) | | |
| $r_{14} = \infty$ (stop) | | |
| $d_{14} = 2.00$ | | |
| $r_{15} = -9.412$ | | |
| $d_{15} = 1.00$ | $n_{15} = 1.84666$ | $\nu_{15} = 23.78$ |
| $r_{16} = -13.640$ | | |
| $d_{16} = 5.00$ (wide-angle), 3.00 (middle), 1.00 (telephoto) | | |
| $r_{17} = 25.424$ (aspherical) | | |
| $d_{17} = 4.19$ | $n_{17} = 1.52542$ | $\nu_{17} = 55.78$ |
| $r_{18} = -16.360$ (aspherical) | | |
| $d_{18} = 7.09$ | | |
| $r_{19} = 37.426$ | | |
| $d_{19} = 1.00$ | $n_{19} = 1.84666$ | $\nu_{19} = 23.78$ |
| $r_{20} = 13.720$ | | |
| $d_{20} = 5.00$ | $n_{20} = 1.60311$ | $\nu_{20} = 60.64$ |
| $r_{21} = -20.381$ | | |
| $d_{21} = 17.97$ (wide-angle), 23.77 (middle), 31.28 (telephoto) | | |

Aspherical Coefficients
Seventeenth Surface
$A_4 = -4.72715 \times 10^{-20}$, $A_6 = 2.08654 \times 10^{-6}$,
$A_8 = -5.32415 \times 10^{-8}$, $A_{10} = 1.13164 \times 10^{-9}$
Eighteenth Surface
$A_4 = 1.07593 \times 10^{-4}$, $A_6 = 1.56693 \times 10^{-6}$,
$A_8 = -2.26281 \times 10^{-8}$, $A_{10} = 5.89758 \times 10^{-10}$ The following are data relative to the amount of movement of the front lens unit $G_{41}$ or the rear lens unit $G_{42}$ of the fourth lens unit in the case where the focusing is performed from the infinite object point to the nearby object point. It is assumed that the movement of the lens unit toward the image side is expressed by a minus sign.

When the front lens unit $G_{41}$ is moved in focusing:

| Object distance | Wide-angle position | Middle position | Telephoto position |
|---|---|---|---|
| 1 m | −0.05 | −0.14 | −0.29 |
| 30 cm | −0.16 | −0.41 | −0.77 |

When the rear lens unit $G_{42}$ is moved in focusing:

| Object distance | Wide-angle position | Middle position | Telephoto position |
|---|---|---|---|
| 1 m | 0.03 | 0.20 | 0.84 |
| 30 cm | 0.10 | 0.59 | 2.42 |

Sixth Embodiment

Figure 9:
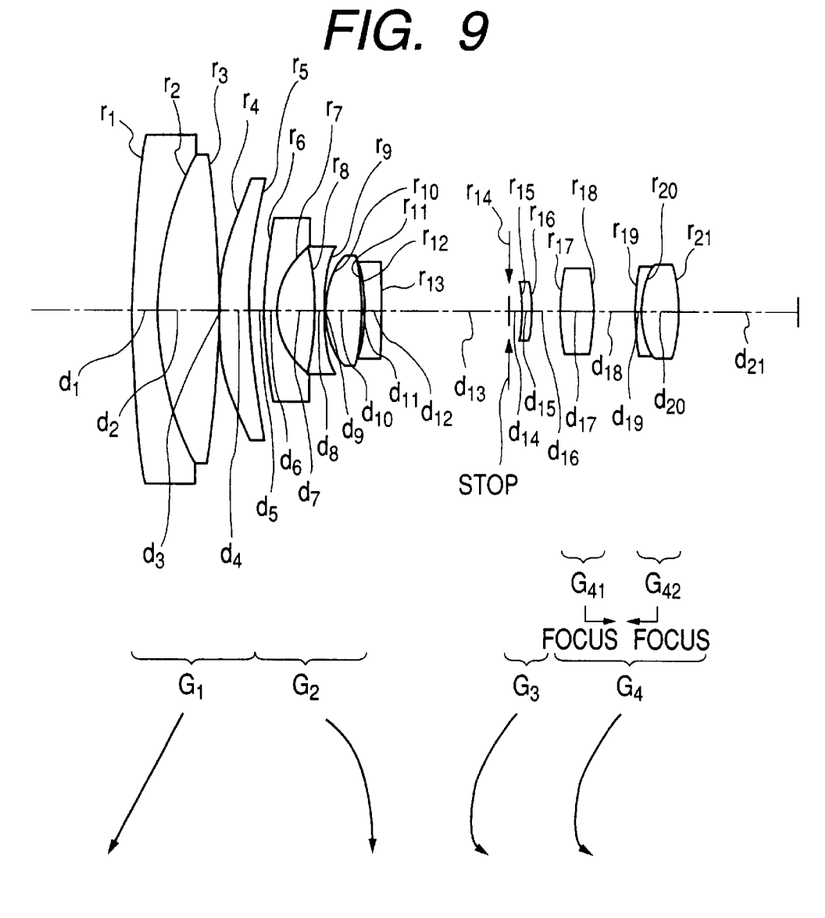
FIG. 9 is a sectional view showing the arrangement, developed along the optical axis, of the zoom lens of a sixth embodiment in the present invention.

The zoom lens of this embodiment, as shown in FIG. 9, comprises, in order from the object side, the first lens unit $G_1$ with a positive refracting power, the second lens unit $G_2$ with a negative refracting power, the third lens unit $G_3$ with a negative refracting power, and the fourth lens unit $G_4$ with a positive refracting power.

The arrangement of the first lens unit $G_1$ is the same as in the first embodiment. The arrangement of the second lens unit $G_2$ is the same as in the fifth embodiment. The arrangement of each of the third and fourth lens units $G_3$ an $G_4$ is the same as in the fourth embodiment.

The zoom lens of the sixth embodiment, as mentioned above, is constructed with a total of 11 lens elements. The zoom lens of the sixth embodiment is designed so that when the magnification is changed, ranging from the wide-angle position to the telephoto position, as indicated by arrows in FIG. 9, the first lens unit $G_1$ is moved along the optical axis from the image side toward the object side and the second lens unit $G_2$ is moved from the object side toward the image side. The third lens unit $G_3$ is moved, laterally with the stop, along the optical axis from the image side toward the object side and then from the object side toward the image side. The fourth lens unit $G_4$ is moved along the optical axis from the image side toward the object side and then from the object side toward the image side.

The focusing relative to a nearby object is performed by moving the front lens unit $G_{41}$ of the fourth lens unit toward the image side or the rear lens unit $G_{42}$ of the fourth lens unit toward the object side.

Various numerical data relative to the zoom lens of the sixth embodiment are shown below.

| | |
|---|---|
| Half angle of view of incidence | 35.4° (wide-angle)–4.8° (telephoto) |
| Focal length | 6.000 (wide-angle)–21.996 (middle)–48.007 (telephoto) |
| F-number | 2.20 (wide-angle)–2.87 (middle)–3.07 (telephoto) |
| $\beta 2t = -0.998$ | |
| $Di = 4.00$ | |
| $f4F = 19.324$ | |
| $f4R = 28.641$ | |
| $\beta 2w = -0.233$ | |
| $\beta 2t/\beta 4t = 0.682$ | |
| $Di/fw = 0.667$ | |

-continued f4F/f4R = 0.674
β4w = −0.890
β4t = −1.463
r₁ = 139.643
  d₁ = 2.73    n₁ = 1.80518    ν₁ = 25.42
r₂ = 34.600
  d₂ = 9.00    n₂ = 1.60311    ν₂ = 60.64
r₃ = −808.428
  d₃ = 0.10
r₄ = 36.558
  d₄ = 5.00    n₄ = 1.83400    ν₄ = 37.16
r₅ = 129.624
  d₅ = 1.00 (wide-angle), 17.02 (middle), 31.31 (telephoto)
r₆ = 42.204
  d₆ = 1.50    n₆ = 1.77250    ν₆ = 49.60
r₇ = 8.933
  d₇ = 6.30
r₈ = −34.748
  d₈ = 1.00    n₈ = 1.81600    ν₈ = 46.62
r₉ = 40.499
  d₉ = 0.10
r₁₀ = 16.062
  d₁₀ = 4.80    n₁₀ = 1.84666    ν₁₀ = 23.78
r₁₁ = −24.973
  d₁₁ = 0.50
r₁₂ = −19.000
  d₁₂ = 1.50    n₁₂ = 1.77250    ν₁₂ = 49.60
r₁₃ = 29.778
  d₁₃ = 17.96 (wide-angle), 2.20 (middle), 2.00 (telephoto)
r₁₄ = ∞ (stop)
  d₁₄ = 2.00
r₁₅ = −14.539
  d₁₅ = 1.00    n₁₅ = 1.84666    ν₁₅ = 23.78
r₁₆ = −27.909
  d₁₆ = 5.12 (wide-angle), 2.23 (middle), 1.00 (telephoto)
r₁₇ = 18.068 (aspherical)
  d₁₇ = 4.38    n₁₇ = 1.52542    ν₁₇ = 55.78
r₁₈ = −21.242 (aspherical)
  d₁₈ = 7.25
r₁₉ = 32.463
  d₁₉ = 1.00    n₁₉ = 1.84666    ν₁₉ = 23.78
r₂₀ = 13.389
  d₂₀ = 5.00    n₂₀ = 1.60311    ν₂₀ = 60.64
r₂₁ = −21.641
  d₂₁ = 18.52 (wide-angle), 28.78 (middle), 27.21 (telephoto)

Aspherical Coefficients

Seventeenth Surface $A_4 = 3.64310 \times 10^{-5}$, $A_6 = 2.17056 \times 10^{-6}$, $A_8 = -3.36174 \times 10^{-8}$, $A_{10} = 8.92870 \times 10^{-10}$ Eighteenth Surface $A_4 = 1.52562 \times 10^{-4}$, $A_6 = 2.47340 \times 10^{-6}$, $A_8 = -3.58281 \times 10^{-8}$, $A_{10} = 1.13356 \times 10^{-9}$ The following are data relative to the amount of movement of the front lens unit $G_{41}$ or the rear lens unit $G_{42}$ of the fourth lens unit in the case where the focusing is performed from the infinite object point to the nearby object point. It is assumed that the movement of the lens unit toward the image side is expressed by a minus sign.

When the front lens unit $G_{41}$ is moved in focusing:

| Object distance | Wide-angle position | Middle position | Telephoto position |
|---|---|---|---|
| 1 m | −0.05 | −0.18 | −0.86 |
| 30 cm | −0.16 | −0.52 | −1.94 |

When the rear lens unit $G_{42}$ is moved in focusing:

| Object distance | Wide-angle position | Middle position | Telephoto position |
|---|---|---|---|
| 1 m | 0.04 | 0.46 | 2.01 |
| 30 cm | 0.12 | 1.35 | 5.24 |

In the numerical data shown in the above embodiments, $r_1, r_2, \ldots$ represent radii of curvature of the surfaces of individual lenses; $d_1, d_2, \ldots$ represent thicknesses of individual lenses or spaces therebetween; $n_1, n_2, \ldots$ represent refractive indices of individual lenses; and $\nu_1, \nu_2, \ldots$ represent Abbe's numbers of individual lenses.

Also, when X is taken as the coordinate in the direction of the optical axis and Y is taken as the coordinate in the direction normal to the optical axis, the configuration of each of the aspherical surfaces in the embodiments is expressed by the following equation:

$$X = \frac{Y^2/r}{1+\sqrt{1-(Y/r)^2}} + A_4 Y^4 + A_6 Y^6 + A_8 Y^8 + A_{10} Y^{10}$$

where r is a paraxial radius of curvature and $A_4, A_6, A_8$, and $A_{10}$ are aspherical coefficients of the fourth, sixth, eighth, and tenth orders, respectively.

Figure 10:
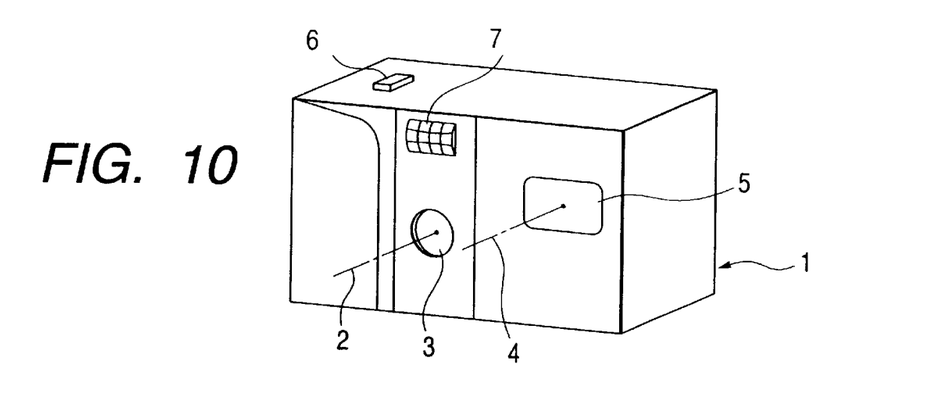
FIG. 10 is a front perspective view showing the appearance of a digital camera using the zoom lens of the present invention.
Figure 11:
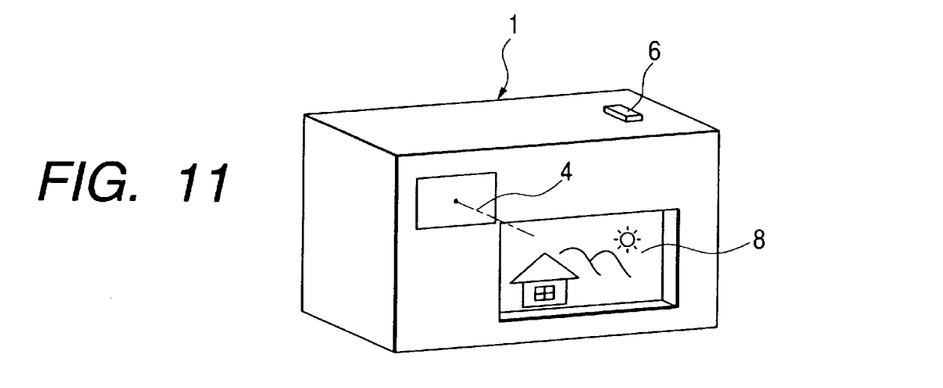
FIG. 11 is a rear perspective view showing the appearance of the digital camera.
Figure 12:
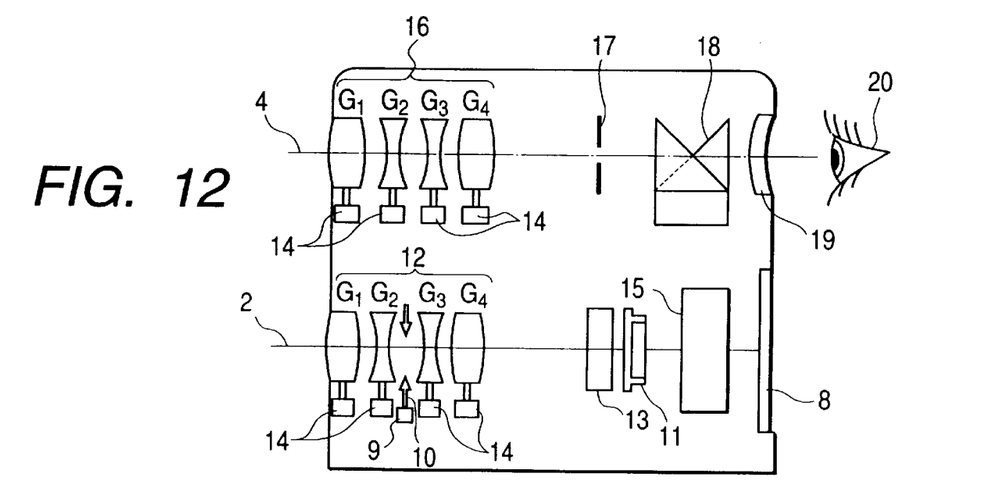
FIG. 12 is a view showing the arrangement of the digital camera.

FIGS. 10, 11, and 12 illustrates the case where the zoom lens of the present invention is used for the photographic zoom lens of a digital camera and the objective optical system of a real image mode variable magnification finder.

In this case, a digital camera 1 includes a photographic zoom lens system 3 with a photographic optical path 2, a finder optical system with a finder optical path 4, a release button 6, a stroboscopic lamp 7, and a liquid crystal display mirror monitor 8. When the release button 6 provided on the upper surface of the camera 1 is pushed, a stop 10 is adjusted to a proper stop value by a variable stop mechanism 9 in association with the release button 6. At the same time, exposure time read by a CCD 11 is controlled and photography is performed through a photographic zoom lens 12.

An object image formed by the photographic zoom lens 12 falls on the image pickup surface of the CCD 11 through a low-pass filter or an IR cutoff filter 13 disposed in the optical path. The adjustment of the focal length and the focusing are performed here by driving motors 14.

The object image received by the CCD 11 is displayed as an electronic image, through a processing means 15, on the liquid crystal display monitor 8 provided on the back surface of the camera 1. The processing means 15 is provided with a memory so that a photographed electronic image can be recorded.

On the other hand, a finder variable-magnification objective optical system 16 is placed on the finder optical path 4 and is associated with the fluctuation of the focal length of the photographic zoom lens 12 so that the focal length is changed by the driving motors 14.

An intermediate image formed by the objective optical system 16 is superimposed with a field frame 17 and is introduced into an eye 20 through a Porro prism 18 for an image erecting optical system and an ocular optical system 19. In this way, a photographing area can be recognized. The Porro prism may be replaced with an image erecting optical system which combines a pentaprism having a roof surface and a mirror.

Although this example shows the digital camera in which the CCD is constructed to be integral with the photographing zoom lens, the photographing zoom lens may be constructed to be independent of the CCD so that a mount portion connecting a lens portion with a body is provided between both. Also, the digital camera may be replaced with a camera which is capable of placing a photographic film at the position of an image plane or a video camera which is capable of photographing moving objects.

What is claimed is:

1. A zoom lens comprising, in order from an object side:
   a first lens unit with a positive refracting power;
   a second lens unit with a negative refracting power;
   a third lens unit with a negative refracting power; and
   a fourth lens unit with a positive refracting power,
   each of said second lens unit, said third lens unit, and said fourth lens unit being moved independently along an optical axis when a magnification of said zoom lens is changed, ranging from a wide-angle position to a telephoto position of said zoom lens,
   wherein said zoom lens satisfies the following conditions:

$$D_i/f_w > 0.65$$
   $$\beta_{2w} > -0.35$$

where $D_i$ is a maximum image height of said zoom lens, $f_w$ is a focal length of said zoom lens at the wide-angle position, and $\beta_{2w}$ is a lateral magnification of said second lens unit at the wide-angle position of said zoom lens.

2. A zoom lens comprising, in order from an object side:
   a first lens unit with a positive refracting power;
   a second lens unit with a negative refracting power;
   a third lens unit with a negative refracting power; and
   a fourth lens unit with a positive refracting power,
   each of said first lens unit, said second lens unit, said third lens unit, and said fourth lens unit being moved independently along an optical axis when a magnification of said zoom lens is changed, ranging from a wide-angle position to a telephoto position of said zoom lens,
   wherein said zoom lens satisfies the following conditions:

$$D_i/f_w > 0.65$$
   $$\beta_{2w} > -0.35$$

where $D_i$ is a maximum height of said zoom lens, $f_w$ is a focal length of said zoom lens at the wide-angle position, and $\beta_{2w}$ is a lateral magnification of said second lens unit at the wide-angle position of said zoom lens.

3. A zoom lens according to claim 2, wherein when the magnification is changed, ranging from the wide-angle position to the telephoto position, said first lens unit is moved toward the object side.

4. A zoom lens according to any one of claims 1–3, wherein a stop placed to be independent of each lens unit is provided and when the magnification is changed, ranging from the wide-angle position to the telephoto position, said stop is moved to be independent of said each lens unit.

5. A zoom lens according to claim 4, wherein said stop is placed in a variable air space coming in contact with said third lens unit.

6. A zoom lens according to any one of claims 1–3, wherein a stop is placed in a variable air space coming in contact with said third lens unit and when the magnification is changed, ranging from the wide angle to the telephoto position, said stop is moved to be integral with a part of said third lens unit along the optical axis.

7. A zoom lens according to any one of claims 1–3, further satisfying the following condition:

$$\beta_{2t}/\beta_{4t} < 2$$

where $\beta_{2t}$ is a lateral magnification of said second lens unit at the telephoto position and $\beta_{4t}$ is a lateral magnification of said fourth lens unit at the telephoto position.

8. A zoom lens according to any one of claims 1–3, wherein when the magnification is changed, ranging from the wide-angle position to the telephoto position, said third lens unit is moved from an image side toward the object side.

9. A zoom lens according to any one of claims 1–3, wherein said fourth lens unit includes a front lens unit with a positive refracting power and a rear lens unit with a positive refracting power.

10. A zoom lens according to claim 4, wherein said front lens unit and said rear lens unit of said fourth lens unit are slightly spaced.

11. A zoom lens according to claim 9, wherein at least one surface of said front lens unit of said fourth lens unit is configured as an aspherical surface.

12. A zoom lens according to claim 11, wherein said aspherical surface used in said front lens unit of said fourth lens unit has such a shape that a refracting power of a surface declines progressively in going from the optical axis to a periphery thereof.

13. A zoom lens according to any one of claims 1–3, wherein the fourth lens unit includes at least one cemented lens.

14. A zoom lens according to any one of claims 1–3, wherein at least one part of said fourth lens unit is used to perform focusing with respect to a finite object point.

15. A zoom lens according to any one of claims 1–3, wherein said fourth lens unit has a variable magnification function.

16. A zoom lens according to claim 15, wherein when the magnification is changed, ranging from the wide-angle position to the telephoto position, an absolute value of the lateral magnification of said fourth lens unit is increased from a value smaller than 1 to a value larger than 1.

17. A zoom lens according to claim 9, wherein said fourth lens unit satisfies the following condition:

$$0.5 < f_{4F}/f_{4R} < 0.7$$

where $f_{4F}$ is a focal length of said front lens unit of said fourth lens unit and $f_{4R}$ is a focal length of said rear lens unit of said fourth lens unit.

18. A camera using a zoom lens, said zoom lens comprising, in order from an object side:
    a first lens unit with a positive refracting power;
    a second lens unit with a negative refracting power;
    a third lens unit with a negative refracting power; and
    a fourth lens unit with a positive refracting power,
    each of said second lens unit, said third lens unit, and said fourth lens unit being moved independently along an optical axis when a magnification of said zoom lens is changed, ranging from a wide-angle position to a telephoto position of said zoom lens,
    wherein said zoom lens satisfies the following conditions:

$$D_i/f_w > 0.65$$
    $$\beta_{2w} > -0.35$$

where $D_i$ is a maximum image height of said zoom lens, $f_w$ is a focal length of said zoom lens at the wide-angle position, and $\beta_{2w}$ is a lateral magnification of said second lens unit at the wide-angle position of said zoom lens.

19. A camera using a zoom lens, said zoom lens comprising, in order from an object side:
   a first lens unit with a positive refracting power;
   a second lens unit with a negative refracting power;
   a third lens unit with a negative refracting power; and
   a fourth lens unit with a positive refracting power,
   each of said first lens unit, said second lens unit, said third lens unit, and said fourth lens unit being moved independently along an optical axis when a magnification of said zoom lens is changed, ranging from a wide-angle position to a telephoto position of said zoom lens,
   wherein said zoom lens satisfies the following conditions:

$$D_i/f_w > 0.65$$

$$\beta_{2w} > -0.35$$

where $D_i$ is a maximum image height of said zoom lens, $f_w$ is a focal length of said zoom lens at the wide-angle position, and $\beta_{2w}$ is a lateral magnification of said second lens unit at the wide-angle position of said zoom lens.

* * * * *